(12) United States Patent
Sato et al.

(10) Patent No.: US 6,507,337 B1
(45) Date of Patent: Jan. 14, 2003

(54) TOUCH PANEL (75) Inventors: Hirotoshi Sato, Shiga (JP); Kazuhiro Noda, Moriyama (JP); Shuji Furukawa, Otsu (JP); Kohtaro Tanimura, Moriyama (JP)

(73) Assignee: Gunze Limited, Kyoto (JP)

( * ) Notice: Subject to any disclaimer, the term of this patent is extended or adjusted under 35 U.S.C. 154(b) by 0 days.

(21) Appl. No.: 09/530,987

(22) PCT Filed: Sep. 8, 1999

(86) PCT No.: PCT/JP99/04854

§ 371 (c)(1),
(2), (4) Date: May 8, 2000

(87) PCT Pub. No.: WO00/16251

PCT Pub. Date: Mar. 23, 2000

(30) Foreign Application Priority Data

Sep. 10, 1998 (JP) ............................................. 10-256463
Sep. 11, 1998 (JP) ............................................. 10-258569
Oct. 22, 1998 (JP) ............................................. 10-301442

(51) Int. Cl.⁷ ................................................. B09G 5/00

(52) U.S. Cl. ..................... 345/173; 345/174; 178/18.05

(58) Field of Search ................................. 345/173, 104, 345/174, 179, 156, 157; 178/18, 18.01–18.11, 19.01–19.07; 341/22, 34

(56) References Cited

U.S. PATENT DOCUMENTS

| 4,585,689 | A |   | 4/1986 | Ohta et al. |
| 5,543,587 | A | * | 8/1996 | Ikura et al. .................... 178/18 |
| 5,623,280 | A | * | 4/1997 | Akins et al. ................. 345/104 |
| 5,668,576 | A | * | 9/1997 | Ikura et al. .................. 345/173 |

FOREIGN PATENT DOCUMENTS

| JP | 7013678 | 1/1995 |
| JP | 9115385 | 5/1997 |
| WO | 0016251 | 3/2000 |

\* cited by examiner

*Primary Examiner*—Dennis-Doon Chow (57) ABSTRACT

The primary object of the present invention is to provide a touch panel which has an excellent contact level between a undercoat layer and a substrate on which the undercoat layer is formed. The secondary object of the present invention to provide a touch panel which is lightweight and provided with a wide operating temperature and impact resistance. The primary object is achieved by providing a metal layer between a conductive-layer forming member and an undercoat layer, the metal layer being formed from a single metal element or an alloy of metal elements. The secondary object of the present invention is achieved by using an amorphous polyolefine base resin sheet for forming conductive-layer forming members of the touch and display substrates and using a material for forming a supporting member so that a difference between linear expansion coefficients of the supporting member and each of the conductive-layer forming members is kept within $1 \times 10^{-5}/°C$.

17 Claims, 3 Drawing Sheets

TOUCH PANEL

FIELD OF THE INVENTION

This invention relates to a touch panel, and particularly relates to a touch panel that has two resistance members facing each other with a certain space in between and that detects a touched position by measuring resistence between each standard point of the two resistance members and a contact point.

BACKGROUND OF THE INVENTION

Recently, personal digital assistants (PDA), sub-notebook personal computers, and the like have been used as portable data terminals. For such data terminals, portability and ease of use are taken into account. In general, as an input device of such a data terminal, a resistence-member touch panel is set on a display device such as a liquid crystal display. Input operations in the data terminal are executed by touching the surface of the resistance-member touch panel by a finger or pen. The touched position is detected as X-Y coordinates.

The resistance-member touch panel has a touch substrate that is used in input operations and a display substrate. The touch substrate is made of polyethylene terephthalate, polycarbonate, or poly methacrylate resin that is transparent. For protection, a light-hardening acrylate resin film is formed on either or both of surfaces of the resin. The display substrate is made of soda-lime glass or tempered glass. The surface of each substrate, that is facing the other substrate, is covered by a thin layer of indium/tin oxide (referred to as "ITO" hereinafter) as a transparent conductive layer.

The touch panel requires high transparency in a visible-light region and, especially the transmittance of light with a wavelength of 550 nm or so needs to be high. To achieve the high transparency for the touch panel, an appropriate metal oxide can be inserted between the conductive substrate (in this case, the touch substrate or display substrate) and the transparent conductive layer, according to an well-known technique. Hereinafter, the inserted metal oxide is referred to as the "undercoat layer." The technique is specifically explained. A metal oxide layer of silicon dioxide ($SiO_2$) or of silicon dioxide/tin oxide base ($SnSiO_x$, for example) is formed between each substrate and the corresponding transparent conductive layer. In this case, the conductive layer, the metal oxide layer, and the film are formed so that their refractive indexes becomes high-low-high or low-high-low in this alternate order in the arrangement. By means of this alternation, the transparency of the touch panel is improved. In general, the light reflectivity is high in areas of the touch panel that are in contact with air, and this is the main factor that decreases the light transmittance. On this account, the technique has a profound significance although it is not further explained in detail in this specification.

As stated above, the transparent conductive substrate is composed of: a substrate that is made of polyethylene tetephthalate, polycarbonate, poly methacrylate resin or glass; an undercoat layer that is made of an insulating metal oxide, such as $SiO_2$, and is directly formed on the substrate; and a transparent conductive layer formed on the undercoat layer. In this construction, a contact level (or, a degree of adhesion) is low between the substrate and the undercoat layer. As such, after the transparent conductive substrate has been left under high temperature and high humidity for long hours or when it comes in contact with any kind of alcohol or alkaline solution, the transparent conductive layer easily comes off the substrate. In this way, the transparent conductive substrate is poor in environment resistance and solution resistance.

When pressure is given to the touch panel through an input operation, a liquid crystal layer of the liquid crystal display directly receives the pressure. This may cause jitter on the liquid crystal layer and so may impair the display function. To avoid this problem, a bond layer is provided on a non-display area (an outer region) of the liquid crystal display, and the touch panel is fixed to the liquid crystal display via this bond layer. By the medium of the bond layer, there would be a space between the touch panel and the liquid crystal display. As such, it should be obvious that the display substrate definitely requires an appropriate rigidity against the pressure.

The following are mainly required as characteristics of the touch panel that is provided for a portable data terminal.

(1) high transparency
(2) high resistance against mechanical impact and friction caused when the touch panel is touched in an input operation
(3) high suitability for reduction in thickness and weight
(4) high impact-resistance (so that the substrate and the like will not be broken when the data terminal is dropped)
(5) wide operating temperature
(6) appropriate rigidity The characteristics described in (1) and (2) can be achieved at the practically required level through: improvements to the technique of forming a transparent conductive layer on the touch substrate made of polyethylene terephthalate and on the display substrate made of glass; insertion of appropriate inorganic metal oxide or resin layer between the touch substrate and the transparent conductive layer; and formation of an appropriate resin layer onto the surface of the touch substrate (this resin layer is referred to as the "hard coat layer" hereinafter).

As to the characteristics described in (3) and (4), the reduction in thickness and weight is limited when only conventional techniques are used. As one example, suppose that glass is used for the display substrate. In this case, even if tempered glass instead of typical soda glass is used, a metal frame for impact absorbency or a transparent resin sheet as a reinforcing material needs to be attached to the surface of the tempered glass. As long as glass is used, it may be impossible to keep the glass from being broken when a strong mechanical impact is given.

To address this problem, it has been suggested that the glass should be replaced with a transparent resin film, such as polycarbonate or polymethyl methacrylate, that is relatively thin and has a proper rigidity.

There are roughly two ways to construct the display substrate when the transparent conductive layer such as ITO is formed on the transparent resin film replacing the glass substrate.

One way is to form the transparent conductive layer directly onto one side of the transparent resin film. Note that the transparent resin film in this example serves as a supporting member formed from material, such as polycarbonate or polymethyl methacrylate. This construction is referred to as the "single-piece construction" that includes the transparent conductive layer and the supporting member.

The other way is achieved by the construction that is referred to as the "multilayer construction" hereinafter. As described above, the transparent resin film is made up of polycarbonate or polymethyl methacrylate whose one side is covered by the transparent conductive layer. In this multilayer construction, a transparent resin sheet, such as polycarbonate or. polymethyl methacrylate, covers the nonconductive surface of the transparent conductive resin, with an acrylic base bond layer being set in between. The transparent resin sheet serves as a supporting member to give the rigidity to the display substrate. Thus, the multilayer construction of the display substrate includes, from above, the transparent conductive layer, transparent resin film, bond layer, and supporting member.

In the case of the single-piece construction, an organosiloxane layer that has a bridging construction is inserted between the supporting member and the transparent conductive layer such as ITO. By doing so, a transparent conductive resin film is realized, which has: durability that is practically required to withstand friction caused from input operations; high adhesion with the transparent conductive layer; transparency; proper rigidity; and heat resistance.

In general, transparent conductive layers are formed according to the vacuum film-thinning technique, such as the sputtering method, resistance evaporating method, and electronic-beam evaporating method. When a transparent conductive layer is formed on polycarbonate with about 0.4% of saturated water content or on polymethyl methacrylate with about 2.0% of saturated water content, a dehydrating process definitely needs to be performed on the substrate before a film is formed on the substrate. If the dehydrating process is not adequately performed, stability in heat resistance of the transparent conductive layer and adhesion between the transparent conductive layer and the substrate are considerably deteriorated.

Thus, the following problem has been pointed out. That is, as compared with a case where glass is used, it takes a longer period of time to finish the dehydrating process in a vacuum when a film is formed in the single-piece construction. This is because, in the single-piece construction, a transparent conductive layer is directly formed on a relatively thick supporting member that has a proper rigidity. In the case of the multilayer construction, meanwhile, the transparent conductive layer is formed on the film of polycarbonate or polymethyl methacrylate that is thinner than the supporting member. Therefore, the dehydrating process can be finished in a shorter period of time, and so mass-productivity can be increased. In addition, this construction is not so complicated. These are the reasons why the multilayer construction has been employed more widely than the single-piece construction.

However, in the case of the multilayer construction, there would be a great difference between linear expansion coefficients of the supporting member and the transparent resin film, depending on a combination of the used materials. The linear expansion coefficients are shown below corresponding to the materials.

Polycarbonate: $\sim 6.2 \times 10^{-5}/°$ C.
Polymethyl methacrylate: $\sim 6.9 \times 10^{-5}/°$ C.
Polyethylene terephthalate: $\sim 1.5 \times 10^{-5}/°$ C.

Because of the difference, the display substrate may be deformed in consequence of changes in environmental conditions, such as temperature and humidity.

For example, when polyethylene terephthalate is used for the transparent resin film, the following problem occurs due to the low glass transition point (about 70° C.). If the touch panel is left in an area exposed to a temperature exceeding 70° C., the transparent resin film will shrink greatly as compared with the supporting member. This results in a low heat-resistance because of deformation, such as corrugation, of the display substrate.

The problem caused by the change in temperature is more remarkable when polyethylene terephthalate is used for the touch substrate. Specifically, a malfunction occurs when an input operation is performed. A further problem is that failures occur to electrical contacts of a panel side connector that connects the touch panel body with a control substrate.

Accordingly, the operating temperature of the touch panel is limited to approximately from 0° C. to 40° C. when polyethylene terephthalate is used for the transparent resin film of the touch substrate or the display substrate.

The deformation caused by the corrugation can be reduced by using material that can minimize a difference in the linear expansion coefficients of each layer comprising the touch panel and the supporting member. As one example, the heat-resistance can be ensured by using polycarbonate whose glass transition point is high (150° C.).

Yet, surface hardness of polycarbonate is low. Thus, it is absolutely necessary to coat both sides of each layer with a transparent resin layer of silicon, cellulose, melamine, urethane, or the like as a protection. Here, the alkali resistance and solution resistance of polycarbonate are low as compared with polyethylene terephthalate. For this reason, there would still be problems. Specifically, a contact level between polycarbonate and the hard coating layer is easy to deteriorate in a wet etching process. The wet etching process is performed for forming a transparent conductive layer such as ITO on the hard coating layer which is absolutely necessary in manufacturing a touch panel. Moreover, although conductive wiring is formed on the transparent conductive layer using mixture ink of carbon and silver ink or silver according to a paint printing method, contact resistance between the conductive wiring and the transparent conductive layer is subject to fluctuation under a high temperature and high humidity.

DISCLOSURE OF THE INVENTION

It is therefore a primary object of the present invention to provide a touch panel which has an excellent contact level between a undercoat layer and a substrate on which the undercoat layer is formed.

It is a secondary object of the present invention to provide a touch panel which is lightweight and provided with a wide operating temperature and impact resistance.

The primary object can be achieved a touch panel made up of a first flat substrate having a first conductive layer on a lower main surface and a second flat substrate having a second conductive layer on an upper main surface, the first conductive layer and the second conductive layer facing each other with a certain space in between, the touch panel also including an undercoat material and a metal material being formed in one of the following arrangements A to E:

A. an undercoat layer is set between the first flat substrate and the first conductive layer, and a metal layer is set between the first flat substrate and the undercoat layer;

B. an undercoat layer is set between the second flat substrate and the second conductive layer, and a metal layer is set between the second flat substrate and the undercoat layer;

C. a first undercoat layer is set between the first flat substrate and the first conductive layer, a first metal layer is set between the first flat substrate and the first undercoat layer, a second undercoat layer is set between the second flat substrate an d the second conductive layer, and a second metal layer is set between the second flat substrate and the second undercoat layer;

D. a first undercoat layer is set between the first flat substrate and the first conductive layer, a metal layer is set between the first flat substrate and the first undercoat layer, and a second undercoat layer is set between the second flat substrate and the second conductive layer; and E. a first undercoat layer is set between the first flat substrate and the first conductive layer, a second undercoat layer is set between the second flat substrate and the second conductive layer, and a metal layer is set between the second flat substrate and the second undercoat layer, wherein the undercoat material includes a metal oxide, and the metal material is a single metal element or an alloy of metal elements.

With this construction, the contact level between the undercoat layer and each flat substrate is improved, thereby preventing the conductive layer from being separated from the undercoat layer.

It is preferable to form the metal material from one or more of silicon, titanium, tin, and zinc.

The secondary object of the present invention can be achieved by a touch panel made up of a first flat substrate having a first conductive layer on a lower main surface and a second flat substrate having a second conductive layer on an upper main surface, the first and second conductive layers facing each other with a certain space in between, wherein the first flat substrate includes a conductive-layer forming member onto which the first conductive layer is formed and a supporting member which supports the conductive-layer forming member, wherein each of the second flat substrate and the conductive-layer forming member is formed from an amorphous polyolefine base resin sheet, wherein a difference between linear expansion coefficients of the supporting member and one of the second flat substrate and the conductive-layer forming member is within $1 \times 10^{-5}/°$ C.

By means of the excellent heat resistance of the amorphous polyolefine base resin sheet and an adjusted difference between the linear expansion coefficients of the layers, a wide operating temperature ranged from $-40°$ C. to $100°$ C. can be provided for the touch panel. Also, the weight of the touch panel is reduced and impact resistance is increased by not using a glass substrate as used in a conventional case.

The supporting member can be formed from one of an amorphous polyolefine base resin sheet, a polycarbonate base sheet, and an acrylic resin sheet.

The amorphous polyolefine base resin sheet can be formed according to one of a solvent casting method and a fusion extruding method.

With this construction of the touch panel, the conductive layers each have a surface roughness that avoids the two conductive layers from sticking together, thereby preventing unreliable inputs from occurring when an input operation is repeated.

A protect member can be set on a lower main surface of the second flat substrate.

By means of this construction, durability to withstand input operations can be increased while the wide operating temperature is maintained.

DESCRIPTION OF THE PREFERRED EMBODIMENTS

The following is a detailed description of a touch panel of the present invention.

First Embodiment
Construction of the Touch Panel

Figure 1:
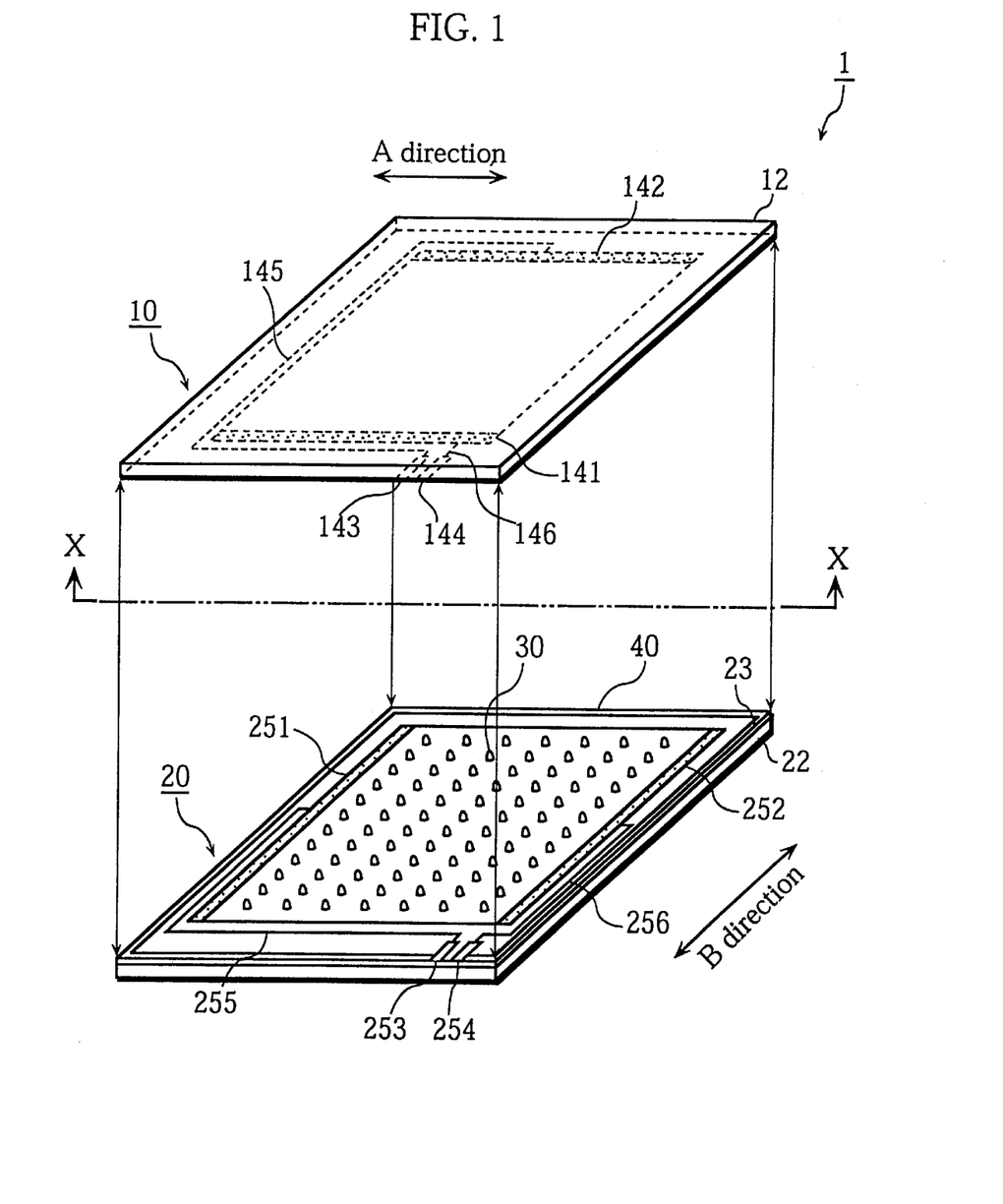
FIG. 1 is an exploded view showing the construction of a touch panel used in the first and second embodiments of the present invention.
Figure 2:
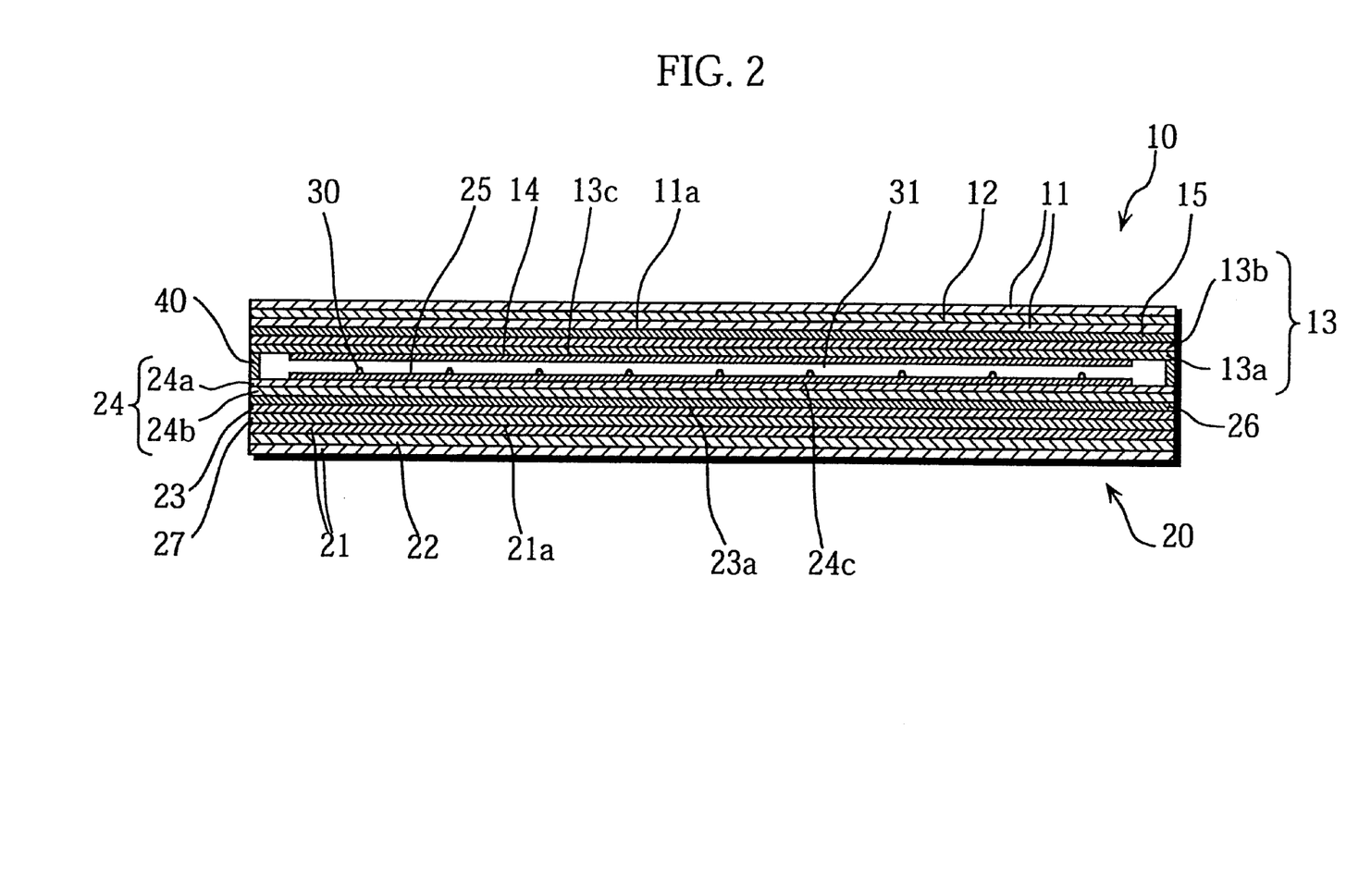
FIG. 2 is a longitudinal sectional view of the touch panel used in the first and second embodiments, the view being taken on the plane of the line X—X of FIG. 1.

FIG. 1 is an exploded view showing the construction of a touch panel 1 used in the first embodiment. FIG. 2 is a longitudinal sectional view of the touch panel 1 after being assembled, the view being taken on the plane of the line X—X of FIG. 1.

The touch panel 1 is a resistance-film touch panel. As shown in FIG. 1, the touch panel 1 is mainly composed of a touch substrate 10 and a display substrate 20. The touch substrate 10 and the display substrate 20 are set facing each other, with spacers 30 being placed in between them so that an air layer 31 (shown in FIG. 2) is formed between the substrates.

The touch substrate 10 is made of material with high transparency and offers superior flexibility and heat-resistance. The touch substrate 10 receives inputs from a user through an input operation executed by the user using a finger or a device. As shown in FIG. 2, the touch substrate 10 is composed of a conductive-layer forming member 12, a hard coat layer 11, an undercoat layer 13, a conductive layer 14, and a contact layer 15.

The hard coat layer 11 is formed on both sides of the conductive-layer forming member 12. An upper surface of the hard coat layer 11 is 11b, and a lower surface of the hard coat layer 11 is 11a. The undercoat layer 13 is formed on the 11a side of the hard coat layer 11. The conductive layer 14 is formed on a lower surface 13c of the undercoat layer 13 so that it comes to the center of the touch panel 1. The contact layer 15 is provided to bond the undercoat layer 13 and the conductive-layer forming member 12.

As shown in FIG. 1, the conductive layer 14 is provided with a pair of electrodes 141 and 142 disposed along its ends to be opposed to each other in A direction. The conductive-layer forming member 12 is provided with a pair of connector electrodes 143 and 144 at its edge, to which connectors (not shown) are connected. The pair of electrodes 141 and 142 are connected to the pair of connector electrodes 143 and 144 via wiring patterns 145 and 146.

As shown in FIG. 1, the display substrate 20 is composed of a hard coat layer 21, a supporting member 22, a conductive-layer forming member 23, an undercoat layer 24, a conductive layer 25, a contact layer 26, and a bond layer 27. The hard coat layer 21 is formed on both sides of the supporting member 22. An upper surface of the conductive layer forming member 23 is 23a. The undercoat layer 24 is formed on the 23a side of the conductive layer forming member 23, with the contact layer 26 being set between the undercoat layer 24 and the conductive layer 23. The conductive layer 25 is formed on the upper surface 24c of the undercoat 24 so that it comes to the center of the touch panel 1. The bond layer 27 bonds the conductive-layer forming member 23 to the supporting member 22, with the hard coat layer 21 being placed between the bond layer 27 and the supporting member 22.

As shown in FIG. 1, the conductive layer 25 is provided with a pair of electrodes 251 and 252 disposed along its ends to be opposed to each other in B direction that is perpendicular to A direction. The conductive-layer forming member 23 is provided with a pair of connector electrodes 253 and 254 at its edge, to which connectors (not shown) are connected. The pair of electrodes 251 and 252 are connected to the pair of connector electrodes 253 and 254 via wiring patterns 255 and 256. Dot-shaped spacers 30, for example, are provided on the surface of the conductive layer 25 at regular distances, such as every few millimeters. The spacers 30 are made of light-hardening acrylic resin, and each spacer is about 10 $\mu$m in height and 10 $\mu$m to 50 $\mu$m in diameter.

Respective outer regions of the touch substrate 10 and the display substrate 20 are bonded together by an adhesive 40, the conductive layers 14 and 25 facing in parallel to each other. Note that the outer regions do not include the parts where the connector electrodes 143, 144, 253, and 254 are located.

Hard Coat Layers 11 and 21

Each of the hard coat layers 11 and 21 has a thickness of a few micrometers and is formed from a silicon base, acrylic base, cellulose base, melamine base, or urethane base resin that is light-hardening type. This resin is applied to the entire surfaces of motherboards (in the present embodiment, the conductive-layer forming member 12 and the supporting member 22). The resin coat, that is the hard coat layer 11, applied to the entire surfaces of the motherboards is hardened by ultraviolet light.

According to the pencil hardness measuring method, it is preferable to have the surface hardness of the hard coat layer 11 at H or higher in terms of durability against friction, adhesion of the transparent conductive layer, and appropriate rigidity of the conductive layer. Actually, it is more preferable to have the surface hardness at 3H or higher.

It should be noted that the hard coat layer 11 is provided for the purpose of improving the durability of the touch panel 1. However, it is not necessary to provide the hard coat layer 11 for the touch panel 1. As another way to further improve the durability, a hard coat layer may be also formed on the surface of the conductive-layer forming member 23.

Conductive Layers 14 and 25

The conductive layers 14 and 25 are made of metal oxides that are transparent and conductive. As the metal oxide for forming the conductive layers 14 and 25, one of the following can be used: ITO; indium oxide ($In_2O_3$); tin oxide with antimony additive ($SnO_2$: Sb); tin oxide with fluorine additive (SnO: F); zinc oxide with aluminum additive (ZnO: Al); zinc oxide with gallium additive (ZnO: Ga); zinc oxide with silicon additive (ZnO: Si); zinc oxide-tin oxide base metal oxide (for example, $ZnSnO_3$); and zinc oxide-indium oxide-magnesium oxide base metal oxide (for example, $Zn_2In_2O_5$—$MgIn_2O_4$)

The conductive layers 14 and 25 are formed as follows. Conductive films are first formed on the respective entire surfaces of the undercoat layers 13 and 24. Then, the outer regions of the films are removed according to the wet etching method, so that the conductive layers 14 and 25 are formed on the undercoat layers 13 and 24 at the respective centers.

Subsequently, through the paint printing method using the mixture ink of carbon and silver ink or silver, the electrodes (141, 142, 251, and 252), the connector electrodes (143, 144, 253, and 254), and the wiring patterns (145, 146, 255, and 256) are formed.

Undercoat Layers 13 and 24, and Contact Layers 15 and 26

The undercoat layer 13 is composed of two layers 13a and 13b, while the undercoat layer 24 is composed of two layers 24a and 24b. These respective two layers are insulators that each are made of a metal oxide with a different refractive index. Note that the layers 13a and 24a are respectively set closer to the conductive layers 14 and 25 than the layers 13b and 24b. The three layers, that are the conductive layer 13 and the layers 13a and 13b (or, the conductive layer 25 and the layers 24a and 24b) are set so that the refractive indexes of these layers become high-low-high in this order when measuring from the conductive layer 14 (or, 25). By setting in this way, the light transmittance in the multilayer construction can be improved.

The layer 13b is formed on the 11a side of the hard coat layer 11, with the contact layer 15 being set in between. Similarly, the layer 24b is formed on the 23a side of the conductive-layer forming member 23, with the contact layer 26 being set in between. Each of the contact layers 15 and 26 is a metal layer made of a single metal element or an alloy of two metal elements or more. It is preferable to form the contact layer using silicon (Si), titanium (Ti), tin (Sn), or zinc (Zn) as the single metal element, or using two or more from these metal elements for the alloy.

The thickness of the contact layers 15 and 26 is thinner than a conventional contact layer which is made of silicon oxide (SiOx, $x \leq 2$). Preferably, the thickness should be set at 10 Å to 50 Å in the present embodiment. If the thickness exceeds 50 Å, the light transmittance is decreased, so that there is no meaning in providing the undercoat layer. Meanwhile, if the thickness is below 10 Å, an adequate contact level is not obtained.

The contact layers 15 and 26 can be formed according to the conventional vacuum film-thinning technique, such as the sputtering method, resistance evaporating method, and electronic-beam evaporating method.

As the metal oxide used for forming the undercoat layers 13 and 24, one of the following materials can be used: silicon oxide ($SiO_2$); titanium oxide ($TiO_2$); tin oxide ($SnO_2$); tin oxide-hafnium oxide base material ($SnO_2$—$HfO_2$, for example); silicon oxide-tin oxide base material ($SiO_2$—$SnO_2$, for example); zinc oxide-tin oxide base material (ZnO—$SnO_2$ or $ZnSnO_3$, for example); and tin oxide-titanium oxide base material ($SnO_2$—$TiO_2$, for example).

The undercoat layers 13 and 24 can be also formed according to the conventional vacuum film-thinning technique, such as the sputtering method, resistance evaporating method, and electronic-beam evaporating method. Suppose that the undercoat layer is to be formed from two different metal oxides and that the sputtering method is employed. In this case, the sputtering efficiency is improved in a case where an alloy of the two different metal oxides is subjected to sputtering, as compared with a case where each of the metal oxides is separately subjected to sputtering. As such, if the thicknesses of the layers formed in the former and latter cases is the same, the former case is more preferable since productivity increases.

Bond Layer 27

The bond layer 27 is made of a mixture of adhesive and plasticizer, and is a thin layer having a predetermined thickness (5 $\mu$m to 100 $\mu$m, for example). As the adhesive, rubber base, acrylic base, or silicon base adhesive can be used.

When a pressure is given through an input operation, the conductive layer 25 of the display substrate 20 receives the pressure. As a result, an elastic deformation, i.e. dent, occurs to the corresponding part of the conductive layer 25. If this elastic deformation repeatedly takes place, elastic recovery of the conductive layer 25 is lost in the worst case. In this worse case, the dent will remains on the surface of the conductive layer 25, thereby leading to unreliable input operations. However, by means of the bond layer 27, the conductive layer 25 increases in elasticity so that such a problem is avoided.

Conductive-Layer Forming Members 12 and 23, and Supporting Member 22

The conductive-layer forming members 12 and 23 can be formed from an amorphous polyolefine base resin, polycarbonate base resin, acrylic resin such as polymethyl methacrylate, or transparent sheet made of material such as polyethylene terephthalate. The amorphous polyolefine base resin will be used in the second embodiment of the present invention, and effects produced by this resin are described later in detail. The supporting member 22 can be formed from a glass substrate, amorphous polyolefine base resin, or acrylic resin substrate made of material such as polycarbonate or polymethyl methacrylate.

In view of weight reduction and impact resistance against accidents such as a drop, it is preferable to form the supporting member 22 using the amorphous polyolefine base resin, acrylic resin made of material such as polycarbonate or polymethyl methacrylate, or polyethylene terephthalate. If the heat resistance is also taken into account, the polycarbonate is more preferable.

Reasons Why Contact Level is Improved between Contact Layer and Each of Undercoat Layer, Hard Coat Layer, and Conductive-Layer Forming Member As stated above, the contact layer is made of a metal element, such as silicon. Due to high reactivity of the metal, the contact layer chemically unite with the undercoat layer, the hard coat layer, and the conductive-layer forming member. This can be said to both cases where the contact layer is formed from a single metal element and from the alloy of a plurality of metal elements. Meanwhile, when silicon oxide is used for forming a contact layer as in the conventional case, reactivity of the contact layer is low. On this account, the contact layer is preferably made of a metal element, such as silicon, so that a high contact level is obtained between the contact layer and each of the undercoat layer, hard coat layer, and conductive-layer forming member.

Modifications

The present invention has been described in accordance with the first embodiment. It should be obvious that the present invention is not limited to the first embodiment, so that the following modifications can be made.

(1) In the stated embodiment, the undercoat layer is composed of a plurality of layers. However, the number of layers comprising the undercoat layer is not limited to more than one. The undercoat layer may be composed of only one layer formed from a material such as silicon oxide.

(2) The undercoat layer and the contact layer may be formed in one of the following arrangements, aside from the arrangement stated in the embodiment.

① The undercoat layer and the contact layer are formed only for the touch substrate.

② The undercoat layer and the contact layer are formed only for the display substrate.

③ The undercoat layer is formed both for the touch and display substrates, and the contact layer is formed only for the touch substrate.

④ The undercoat layer is formed both for the touch and display substrates, and the contact layer is formed only for the display substrate.

(3) In the stated embodiment, the conductive-layer forming member 23 is made of resin. However, material used for forming the conductive-layer forming member 23 is not limited to this, and inorganic material, such as glass, can be used. In this case, a conductive layer, such as ITO, may be directly formed on the conductive-layer forming member 23. Then, the conductive-layer forming member 23 may be affixed to a supporting member onto which a contact layer has been formed in advance. This is to say, the conductive-layer forming member 23 may also serve as the undercoat layer.

EXAMPLE 1

In order to verify the effects of the contact layer, four touch panels each having the construction shown in FIG. 1 were made. These four touch panels are referred to as F1TP, F2TP, F3TP, and F4TP. The touch panels were made of respective transparent conductive films as shown in Table 1 below. Transparent conductive films F1, F2, F3, and F4 were respectively used for the touch panels F1TP, F2TP, F3TP, and F4TP. Note that the same transparent conductive film was used for both the touch substrate and the display substrate of each touch panel. The transparent conductive films F2 and F4 relate to the first embodiment where the contact layers are made of silicon. Meanwhile, the transparent conductive films F1 and F3 relate to a comparative embodiment where the contact layers are not provided.

A conductive-layer forming member of the touch substrate was formed using ARTON film having a thickness of 100 $\mu$m that was manufactured by JSR Corporation. The ARTON film was manufactured according to the solvent casting method. In this example, an acrylic-based hard coat layer hardened under light was further formed on both sides of the ARTON film, the thickness of the hard coat layer being 5 $\mu$m.

As in the case of the touch substrate, a conductive-layer forming member of the display substrate was formed using ARTON film. In this example, the conductive-layer forming member formed from ARTON film is bonded to the entire surface of a polycarbonate substrate having a thickness of 0.4 mm, using an adhesive double coated tape manufactured by Nitto Denko Corporation and identified by the model number HJ9150W.

TABLE 1

| No | Multilayer Construction |
|----|-------------------------|
| F1 | constructive-layer forming member/SiO2/ITO(300Å) |
| F2 | constructive-layer forming member/Si(20Å)/SiO2(500Å)/ITO(300Å) |
| F3 | constructive-layer forming member/SnO2(600Å)/SiO2(450Å)/ITO(300Å) |
| F4 | constructive-layer forming member/Si(20Å)/SnO2(600Å)/SiO2(450Å)/ITO(300Å) |

Each layer is formed according to the magnetron sputtering method, and each thickness of the layers is measured using a profilometer.

EXPERIMENT

These touch panels F1TP to F4TP were left at a temperature of 80° C. and a humidity of 90%. After leaving them for 500 hours and then 1000 hours, linearity in each detection region of the ITO layers of the touch substrate and the display substrate was measured for each touch panel. The way in which the linearity was measured is explained. A direct current of 5V was first applied between the silver electrodes (141 and 142 in FIG. 1) of the touch substrate, and then a voltage of the touch substrate (V1) was measured at the ITO layer (may be referred to as the "ITO electrode") of the display substrate. In this case, the ITO layer of the display substrate served as a voltage detection electrode.

Here, suppose that a voltage theoretically obtained in the same detection region was V2 (referred to as the "theoretical value" hereinafter). A difference between V1 and V2 was obtained by calculating (V2−V1). Then, the difference was divided by the theoretical value V2, i.e. ((V2−V1)/V2). The obtained value was defined as the linearity (%) of the touch substrate. In this way, the linearity distribution in the detection region of the touch substrate was obtained. Similarly, a direct current of 5V was applied between the silver electrodes (251 and 252 in FIG. 1) formed on the ITO layer of the display substrate, and then a voltage of the display substrate was measured at the ITO layer of the touch substrate. In this case, the ITO layer of the touch substrate served as a voltage detection electrode. The linearity distribution in the detection region of the display substrate was also obtained. In general, the higher the linearity, the greater the deterioration of the conductive layer.

Results

The maximum values of the linearity in the detection regions of the touch panels F1TP to F4TP are shown in Table 2, together with initial values of the transmittance with a wavelength of 550 nm.

under the high temperature and high humidity, meaning that their stabilities were high. Each of the touch panels F2TP and F4TP was made of a transparent conductive film, with a silicon contact layer being inserted. On the other hand, the linearity of the touch panels F1TP and F3TP deteriorated after being left under the stated environmental conditions for long hours. The deterioration was caused by separation of the ITO layer from the transparent conductive film.

The results of the present experiment indicated the adhesion of the conductive layers of the touch panels F2TP and F4TP relating to the first embodiment was extremely higher than the adhesion of the conductive layers of the touch panels F1TP and F3TP relating to the comparative embodiment. Also, the results showed a high degree of effectiveness of the contact layer that was made of metal.

EXAMPLE 2

In accordance with the first embodiment, six transparent conductive films F5 to F10 were made as shown in Table 3, each film being composed of a conductive-layer forming

TABLE 2

| | touch panel | | | | | | | |
|---|---|---|---|---|---|---|---|---|
| | F1TP | | F2TP | | F3TP | | F4TP | |
| linearity | touch board | display board | touch board | display board | touch board | display board | touch board | display board |
| initial value | 0.14(%) | 0.13(%) | 0.18(%) | 0.11(%) | 0.13(%) | 0.13(%) | 0.11(%) | 0.13(%) |
| 500 hours later | 0.70(%) | 1.00(%) | 0.20(%) | 0.15(%) | 1.01(%) | 0.63(%) | 0.12(%) | 0.20(%) |
| 1000 hours later | 3.00(%) | 4.10(%) | 0.22(%) | 0.15(%) | 3.03(%) | 2.00(%) | 0.12(%) | 0.13(%) |
| transmittance | 81% | | 81% | | 90% | | 90% | |

As can be clearly seen from Table 2, the linearity of the touch panels F2TP and F4TP hardly changed over time member, conductive layer, undercoat layer, and contact layer.

TABLE 3

| | conductive-layer forming member | contacting layer (thickness) | undercoat layer (thickness) | conductive layer (thickness) | initial transmittance (%) (550 nm) |
|---|---|---|---|---|---|
| film F5 | PET | not provided | $SiO_2$(500Å) | ITO(300Å) | 90.5 |
| film F6 | PET | Si(10Å) | $SiO_2$(500Å) | ITO(300Å) | 90.7 |
| film F7 | PET | not provided | $ZnSnO_3$(600Å), $SiO_2$(450Å) | ITO(300Å) | 95.1 |
| film F8 | PET | Si(10Å) | $ZnSnO_3$(600Å), $SiO_2$(450Å) | ITO(300Å) | 95.2 |
| film F9 | PET | Zn + Sn(13Å) | $ZnSnO_3$(600Å), $SiO_2$(450Å) | ITO(300Å) | 94.8 |
| film F10 | PET | Si + Sn(15Å) | $ZnSnO_3$(600Å), $SiO_2$(450Å) | ITO(300Å) | 95.0 |

( Films F6, F8, F9, and F10 relate to the embodiment
Films F5 and F7 relate to a comparative embodiment The films F6, F8, F9, and F10 relate to the first embodiment, while the films F5 and F7 relate to a comparative embodiment.

The layers comprising the film F6 were formed from respective materials as follows. The conductive-layer forming member was made of polyethylene terephthalate (PET). The contact layer was formed from a silicon film having a thickness of 10 Å. The undercoat layer was formed from a silicon oxide ($SiO_2$) film having a thickness of 500 Å. The conductive layer was formed from an ITO film having a thickness of 300 Å.

The layers comprising the film F8 were formed from respective materials as follows. The conductive-layer forming member was made of polyethylene terephthalate (PET) as in the case of the film F6. The contact layer was also formed from a silicon film having a thickness of 10 Å. The conductive layer was formed from an ITO film having a thickness of 300 Å. The undercoat layer was composed of two layers. One layer situated closer to the conductive-layer forming member was formed from a silicon oxide-tin oxide base ($ZnSnO_3$) film having a thickness of 600 Å. The other layer situated on the stated layer was formed from a silicon oxide ($SiO_2$) film having a thickness of 450 Å.

The layers comprising the film F9 were the same as those comprising the film F8, except that the contact layer of the film F9 was formed from an alloy of zinc and tin.

The layers comprising the film F10 were the same as those comprising the film F8, except that the contact layer of the film F10 was formed from an alloy of silicon and tin.

The layers comprising the film F5 were the same as those comprising the film F6, except that the contact layer was not provided for the film F5.

The layers comprising the film F7 were the same as those comprising the film F8, F9, or F10, except that the contact layer was not provided for the film F7.

Experiment 1

Experiment in Alkali Resistance

Each film was immersed in a 2% solution of sodium chloride (NaCl) for predetermined periods of time separately, 5 minutes, 15 minutes, 5 hours, and 15 hours. The temperature of the solution was kept at 25° C. or lower. After the immersion, each film was washed in water and a tape adhesion test was performed on the surface of the ITO electrode. Then, the surface of the ITO electrode was examined under a microscope. A resistance of the surface of the ITO electrode was also measured.

In the tape adhesion test, onto the ITO electrode that served as the conductive layer of the transparent conductive film, an adhesive tape was affixed and then stripped off. This operation was conducted once for each test.

Experiment 2

Experiment in High Temperature/High Humidity Resistance

Each film was left at a temperature of 80° C. and humidity of 90% for predetermined periods of time, 24 hours, 120 hours, and 500 hours. After the tape adhesion test, the surface of the ITO electrode was examined under a microscope. A resistance of the surface of the ITO electrode was also measured.

Through the experiments 1 and 2, the contact level between the PET film (the conductive-layer forming member) and the contact layer was assessed.

Results

The results of the experiments 1 and 2 are shown in Table 4 below.

TABLE 4

| | | | | | | | | | | | | | |
|---|---|---|---|---|---|---|---|---|---|---|---|---|---|
| | | \multicolumn{2}{c}{(Results)} | | | | | | | | | | |
| | | F5 | | F6 | | F7 | | F8 | | F9 | | F10 | |
| initial surface resistance (Ω/sq) | | 320 | | 300 | | 302 | | 310 | | 305 | | 298 | |
| alkali resistance | separation | resistance | separation | resistance | separation | resistance | separation | resistance | separation | resistance | separation | resistance |
| 5 minutes later | Δ | 1.02 | ○ | 1.00 | Δ | 1.04 | ○ | 1.00 | ○ | 1.01 | ○ | 1.02 |
| 15 minutes later | X | 1.80 | ○ | 1.00 | Δ | 1.23 | ○ | 1.01 | ○ | 1.04 | ○ | 1.03 |
| 5 hours later | X | unmeasurable | ○ | 1.01 | X | 3.89 | ○ | 1.01 | ○ | 1.10 | ○ | 1.08 |
| 15 hours later | X | unmeasurable | ○ | 1.02 | X | unmeasurable | ○ | 1.08 | Δ | 1.13 | Δ | 1.10 |
| temperature/humidity resistance | separation | resistance | separation | resistance | separation | resistance | separation | resistance | separation | resistance | separation | resistance |
| 24 hours later | ○ | 1.01 | ○ | 1.01 | Δ | 1.05 | ○ | 1.02 | ○ | 1.00 | ○ | 1.04 |
| 120 hours later | Δ | 2.30 | ○ | 1.04 | Δ | 1.50 | ○ | 1.08 | ○ | 1.02 | ○ | 1.09 |
| 500 hours later | Δ | 4.10 | ○ | 1.05 | Δ | 3.80 | ○ | 1.11 | ○ | 1.05 | ○ | 1.15 |

○: no change Δ: cracking X: separation
*Resistance is shown as a rate with respect to the initial value.

The visible-light transmittance at a wavelength of 550 nm is shown in the rightmost column of Table 3 for each of the films F5 to F10. To be more specific, the transmittance was set 90.5% for the film F5, 90.7% for the film F6, 95.1% for the film 7, 95.2% for the film 8, 94.8% for the film F9, and 95.0% for the film F10. In particular, the transmittances for the films F7 to F10 were set higher since each undercoat layer of these films was composed of two layers. By means of the higher light transmittance, the transparency of the films was improved.

The following experiments were conducted using the films F5 to F10 to check respective characteristics.

Each result corresponding to "separation" is shown as one of symbols ○, Δ, or X. These symbols indicate the states of the conductive layers. The symbol ○ indicates that the state of the conductive layer has not been changed. The symbol Δ indicates that cracking has occurred to the surface of the conductive layer although it has not been separated from the transparent conductive film. The symbol X indicates that the conductive layer has been separated from the transparent conductive film. The resistance is shown as the rate of change with respect to the initial surface resistance. As the initial values, 320Ω per unit area was set for the film F5, 300Ω per unit area for the film F6, 302Ω per unit area for the film F7, 310Ω per unit area for the film F8, 305Ω per unit area for the film F9, and 298Ω per unit area for the film F10. As clearly understood from the results shown in Table 4, the films F5 and F7 having no contact layers did not show satisfactory results in the experiment in alkali resistance. Only after 5 minutes' immersion in the alkaline solution, the cracking on the surfaces of the conductive layers of the films F5 and F7 was distinguished microscopically. Furthermore, after 5 hours' immersion, it was apparent that the conductive layers were separated from the corresponding transparent conductive films F5 and F7. The resistance of the conductive layer of each film F5 and F7 increased with increasing period of immersion. Actually, after 15 hours' immersion, the resistance of the films F5 and F7 was too high to be measured in this experiment.

Meanwhile, the films F6, F8, F9, and F10 relating to the first embodiment showed satisfactory results. Even after 15 hours' immersion in the alkaline solution, only cracking was found on the films 9 and F10 and no separation was observed in any of these films. In addition, among all of the resistance values of the films F6, F8, F9, and F10, the maximum value was 1.13 with respect to the initial value.

Next, the results obtained through the experiment in high temperature/high humidity resistance are described. As in the case of the experiment in alkali resistance, the films F5 and F7 did not show satisfactory results. After a lapse of 120 hours, the cracking on the surfaces of the conductive layers of the films F5 and F7 was distinguished microscopically. Furthermore, the resistance increases with the passage of time under the stated environmental conditions. After a lapse of 500 hours in particular, each resistance of the films F5 and F7 was about four times greater than the corresponding initial value.

On the other hand, the films F6, F8, F9, and F10 relating to the first embodiment showed satisfactory results. Even after a lapse of 500 hours, no separation was observed, to say nothing of cracking. In addition, among all of the resistance values of the films F6, F8, F9, and F10, the maximum value was 1.15 with respect to the initial value.

The results of these two experiments indicated that the contact level of each conductive layer of the films F6, F8, F9, and F10 was higher than the contact level of each conductive layer of the films F5 and F7. Moreover, the results showed a high degree of effectiveness of the contact layer that was made of metal.

Note that the rate of increase in resistance of the film F7 was smaller than the rate of the film F5 in both of the experiments. This result indicated that one layer comprising the undercoat layer of the film F7 slightly contributed to improvement in the contact level with the PET film.

Second Embodiment

The following is a description of a touch panel used in the second embodiment of the present invention.

The touch panel of the second embodiment is basically the same as that of the first embodiment. Therefore, the same construction will not be explained, and only different points will be described.

In the second embodiment, by changing materials used as the supporting member 22 and conductive-layer forming members 12 and 23, the characteristics of the touch panel are further improved in its wide operating temperature, weight, and impact resistance. It should be noted here that a conducting layer does not need to be provided in the second embodiment.

A sheet that has a predetermined thickness and is formed from an amorphous polyolefine base resin is used for forming each of the conductive-layer forming members 12 and 23. It is preferable to set the thickness of the sheet at 25 μm to 300 μm. If the thickness is below 25 μm, an adequate mechanical strength cannot be obtained. If it exceeds 300 μm, it takes a longer period of time to finish the dehydrating process. This amorphous polyolefine base resin sheet has characteristics (A) to (E) as described below. These characteristics make the amorphous polyolefine base resin sheet suitable for the construction of the touch panel.

(A) extremely high visible-light transmittance (i.e. high transparency)

(B) a glass transition point of 120° C. (i.e. high heat-resistance)

(C) high solution resistance (D) low moisture absorbency (E) linear expansion coefficient expressed as $5\sim7\times10^{-5}/°$ C.

The following effectiveness are achieved through the characteristics (A) to (D).

Owing to the characteristic (A), the transparency of the entire touch panel is improved. As compared with a conventional case where a resin sheet formed from polyethylene terephthalate or polycarbonate is used, the transparency is considerably improved.

Through the characteristic (B), the touch panel is resistant to thermal deformation even in a temperature higher than the highest operating temperature of a conventional touch panel. This is to say, a main factor that leads to unreliable input operation can be eliminated.

Next, the effectiveness achieved through the characteristic (C) is described. As stated in the first embodiment, the wet etching process is performed when a transparent conductive layer such as ITO is formed on the hard coating layer that is absolutely necessary in manufacturing a touch panel. Owing to the high resolution resistance as the characteristic (C), the contact level between the hard coat layer and the conductive layer is not lowered in the wet etching process.

Through the characteristic (D), dehydration can be finished in a short period of time when the conductive-layer is formed.

Here, as the amorphous polyolefine base resin, a resin having a functional group that is spatially voluminous with respect to a polymer principal chain can be used so that crystallization can be reduced. To be more specific, the resin may be formed using ZEONEX manufactured by Nippon Zeon Co., Ltd. The ZEONEX is a hydrogen addictive of a ring-opening polymerization polymer composed of 6-methyl-1-, 4:5,8-dimethano-1,4,4a,5,6,7,8',8a-octahydronaphthalene. Also, norbornene resin base ARTON manufactured by JSR Corporation may be used as the resin. Alternatively, APEL manufactured by Mitsui Chemicals, Ltd. may be used. The APEL is an ethylen-norbrnene addition copolymerization polymer or an ethylen-tetracyclododecene addition polymerization polymer.

In the present embodiment, a resin sheet is formed from one of the above-mentioned amorphous polyolefine base resins, according to the well-known solvent casting method or fusion extruding method. It is preferable to form the resin sheet according to the former method. This is because the resin sheet formed by the solvent casting method is more resistant to oxidizing and so is not subject to be colored during manufacturing. This means that the transparency of the resin sheet is higher than that of a resin sheet formed according to the fusion extruding method.

The supporting member 22 is a flat member having an appropriate thickness (0.3 mm to 3 mm, for example).

Owing to the thickness, an appropriate rigidity can be obtained. The supporting member 22 is formed from material that keeps a difference of linear expansion coefficients of the supporting member 22 and each of the conductive-layer forming members 12 and 23 within $1 \times 10^{-5}/°$ C. For example, an amorphous polyolefine base resin, polycarbonate base resin, or acrylic resin such as polymethyl methacrylate can be used for forming the supporting member 22. In particular, the amorphous polyolefine base resin or polycarbonate base resin is preferable for its high heat-resistance. The supporting member 22 may be formed by laminating a plurality of resin sheets each made of a different one of the stated materials.

As stated above, the supporting member 22 is formed from material that keeps a difference of linear expansion coefficients of the supporting member 22 and each of the conductive-layer forming members 12 and 23 within $1 \times 10^{-5}/°$ C. Consequently, corrugation caused by the difference can be reduced even in a wide operating temperature ranged from −40° C. to 100° C.

Another effectiveness can be achieved by setting a difference of linear expansion coefficients within $1 \times 10^{-5}/°$ C. Specifically, a difference in volume changes of the members can be considerably reduced and, therefore, the occurrence of stress due to the volume change can be also reduced. Accordingly, the touch panel is prevented from being deformed.

It is preferable to adjust the surface roughness of the conductive layers so that physical absorption between them is prevented during an input operation. The surface roughness of the amorphous polyolefine base resin used for forming the conductive-layer forming members 12 and 23, onto which the conductive layers are formed, is low and so is an extremely flat sheet. As such, a conductive layer formed on this flat sheet reflects the flat surface, that is, the surface of the conductive layer also becomes flat. This can be said tog case when a hard coat layer is formed. Without adjustment, the conductive layers are easy to stick to each other, thereby causing errors when an input operation is repeated.

The surface roughness is set at 0.05 μm to 2 μm according to the assessment of the center line average height defined in the Japanese Industrial Standards, and is set at 0.6 μm to 3 μm in height at the maximum. Note that the surface roughness of both the conductive layers 13 and 24 may be set in this way. Alternatively, the surface roughness of either conductive layer 13 or 24 may be set.

The surface roughness can be adjusted according to the following five methods.

① A method of pressing the surfaces, onto which the conductive layers are to be formed, of the conductive-layer forming members 12 and 23 using a metal roller having a desired surface roughness. In this case, the hard coat layer may be formed on the conductive-layer forming member 12.

② A method of forming asperities on the conductive-layer forming members 12 and 23 by pressing a stamping die with heat, the stamping die having asperities on its surface.

③ A method of coating the surfaces of the conductive-layer forming members 12 and 23 with coating material including organic or inorganic fine grains, before the conductive layers are formed.

④ A combination method of the methods ① and ③.

⑤ A combination method of the methods ② and ③.

EXAMPLE 3

Touch panels TP1, TP2, TP3, and TP4 were made to check their characteristics. The touch panels TP1 and TP2 relate to the second embodiment, while the touch panels TP3 and TP4 relate to a comparison embodiment. The following is a description of results obtained by examining the characteristics of these touch panels TP1 to TP4.

The touch panels TP1 to TP4 were mainly formed from respective materials shown in

TABLE 5

| construction | thickness | panel TP1 | panel TP2 | panel TP3 | panel TP4 |
|---|---|---|---|---|---|
| conductive-layer forming member of touch board | (188 μm) | ARTON | ARTON | PET | PET |
| conductive-layer forming member of display board | (188 μm) | ARTON | ARTON | ARTON | PET |
| supporting member | (0.5 mm) | PC | ARTON | PC | PC |
| bond layer | (50 μm) | adhesive double coated tape of Nitto Denko Corp(model NO.: HJ9150W) | | | |
| temperature cycle | | −40° C.(60 min)~100° C.(100 min) × 100 cycles, temperature raised by 2° C./min | | | |
| appearance | | | | | |
| low temp causing deformation | | — | — | around 0° C. | around 0° C. |
| deformed state | | no deformation | no deformation | projections on PET | projections on both PET |
| high temp causing deformation | | — | — | around 80° C. to 100° C. | around 50° C.(depressions) |
| state at room temp after exp | | no deformation | no deformation | corrugation on PET | projections |
| electric contact(change of terminal resistance) | | stable(within 1.1) | stable(within 1.1) | 1.1 | 2.0 |

The materials having used for forming the touch panel TP1 are first described. ARTON was used for the conductive-layer forming member 12 of the touch substrate and the conductive-layer forming member 23 of the display substrate. The supporting member 22 was formed from polycarbonate (PC). As the bond layer 27, an adhesive double coated tape manufactured by Nitto Denko Corporation and identified by the model number HJ9150W was used.

The materials having used for forming the touch panel TP2 are next described. ARTON was used for the conductive-layer forming member 12 of the touch substrate, the conductive-layer forming member 23 of the display substrate, and the supporting member 22. As the bond layer 27, an adhesive double coated tape manufactured by Nitto Denko Corporation and identified by the model number HJ9150W was used as in the case of the touch panel TP1.

The materials having used for forming the touch panel TP3 relating to the comparison embodiment are described. The conductive-layer forming member 12 of the touch substrate was made of polyethylene terephthalate (PET). ARTON was used for forming the conductive-layer forming member 23. The supporting member 22 was made of polycarbonate (PC). As the bond layer 27, an adhesive double coated tape manufactured by Nitto Denko Corporation and identified by the model number HJ9150W was used.

The materials having used for forming the touch panel TP4 relating to the comparison embodiment are next described. Polyethylene terephthalate (PET) was used for forming the conductive-layer forming member 12 of the touch substrate and the conductive-layer forming member 23 of the display substrate. The supporting member 22 was made of polycarbonate (PC). As the bond layer 27, an adhesive double coated tape manufactured by Nitto Denko Corporation and identified by the model number HJ9150W was used.

In the touch panels TP1 and TP2, the difference of linear expansion coefficients of the supporting member 22 and each of the conductive-layer forming members 12 and 23 was kept within $1\times10^{-5}/°$ C. by means of the stated combination of the materials.

In the touch panels TP3 and TP4, the difference of the linear expansion coefficients exceeded $1\times10^{-5}/°$ C. by means of the stated combination of the materials.

The characteristics of the touch panels TP1 to TP4 made of the stated respective materials were examined under the following environmental conditions.

First, the touch panels TP1 to TP4 were exposed to a temperature of $-40°$ C. for 60 minutes. Subsequently, the temperature was raised by a $2°$ C. per minute to $100°$ C. and the touch panels TP1 to TP4 were exposed to a temperature of $100°$ C. for 100 minutes. This process corresponds to one cycle, and the cycle was repeated 100 times. Note that a temperature $100°$ C. was lowered by a $2°$ C. per minute to $-40°$ C. After the 60 minutes' exposure to $-40°$ C. and the 100 minutes' exposure to $100°$ C., the touch panels were checked to see whether any deformation had been occurred.

Also, every time one cycle was finished, each terminal resistance between the connector electrodes 143 and 253, and between the connector electrodes 144 and 254 was detected. These results are shown in Table 5, together with the results of deformation checking.

As shown in Table 5, deformation occurred to the entire surfaces of the touch panels TP3 and TP4 at a temperature of $0°$ C. or so, due to corrugation of the layers made of polyethylene terephthalate (PET). On the other hand, no deformation occurred to the touch panels TP1 and TP2 at temperatures of $-40°$ C. and $100°$ C.

After the 100 cycles were finished, the touch panels TP3 and TP4 were left at room temperature. However, these touch panels did not return to their former states. This indicated that critical deformations had occurred to the touch panels TP3 and TP4 through the exposures to a low temperature of $-40°$ C. and high temperature of $100°$ C. Meanwhile, although the touch panels TP1 and TP2 were also left at room temperature after the 100 cycles, no deformations occurred to these touch panels.

As to the terminal resistance (i.e. the resistance between the touch substrate and the display substrate), results are shown as a rate of change with respect to the initial resistance between the touch substrate and the display substrate. Around 20th cycle, the resistance in the touch panel TP3 was 1.1 and the resistance in the touch panel TP4 reached 2.0. On the other hand, each resistance in the touch panels TP1 and TP2 was 1.1 even after the 100 cycles were finished. This results indicated outstanding stability of the touch panels TP1 and TP2.

The following can be said in consequence of the above results. A touch panel which is operational at a high temperature and is resistant to a change in temperature can be achieved, by using amorphous polyolefine for forming the conductive-layer forming members 12 and 23 and by setting the difference of linear expansion coefficients of the supporting member 22 and each of the conductive-layer forming members 12 and 23 within $1\times10^{-5}/°$ C.

With regards to the touch panels TP3 and TP4, the terminal resistance may be three times greater than the initial values around the 20 th cycle, depending on the wiring structures of the electrodes. However, such a change in the terminal resistance due to different wiring structures was not found in the touch panels TP1 and TP2. This means that the overall constructions of the touch panels TP1 and TP2 relating to the second embodiment are more stable than those of the touch panels TP3 and TP4 relating to the comparison embodiment.

Third Embodiment

Next, a touch panel used in the third embodiment is explained. This touch panel is basically the same as that of the second embodiment, except that the touch panel of the third embodiment is provided with a function of increasing the limited total number of input operations performed by the user. The same construction is not explained, and description for different parts is only given in this embodiment.

Figure 3:
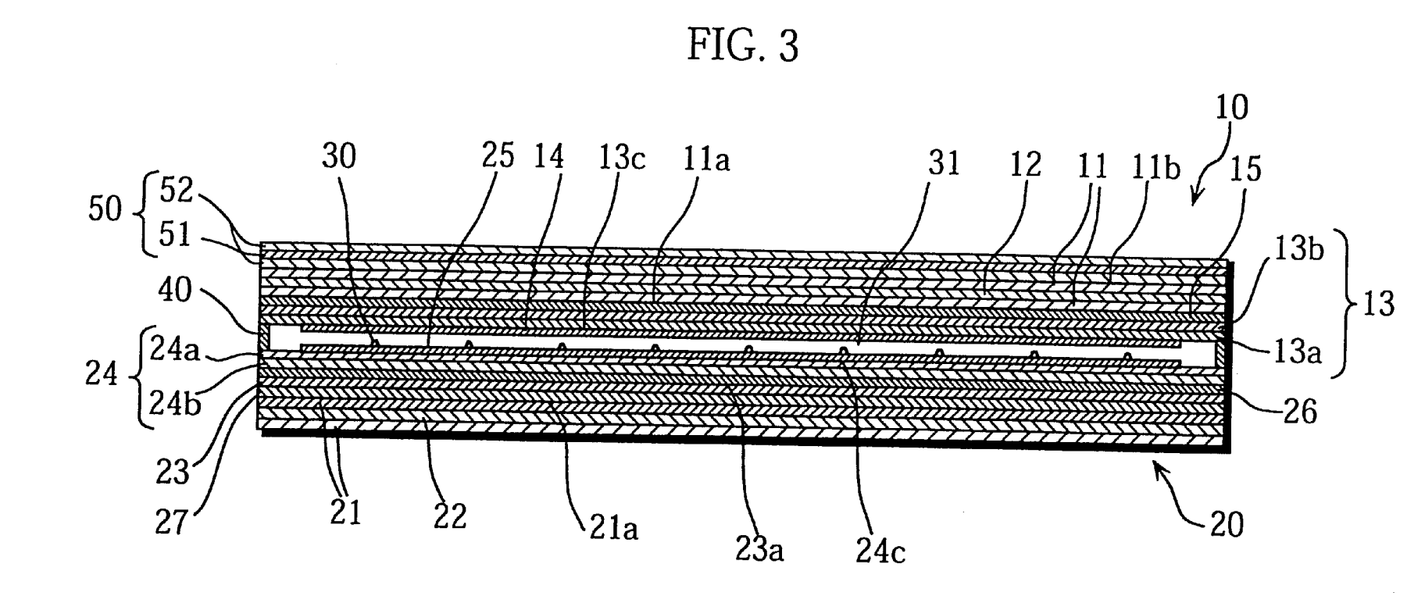
FIG. 3 is a longitudinal sectional view of a touch panel used in the third embodiment of the present invention.

FIG. 3 is a longitudinal sectional view of the touch panel, and the drawing corresponds to FIG. 2.

As shown in FIG. 3, a protect member 50 is formed on an upper surface 11b of the hard coat layer 11 that is in turn formed on the conductive-layer forming member 12 of the touch substrate. Note that an acrylic base adhesive layer (not shown) is set between the protect member 50 and the upper surface 11b of the hard coat layer 11.

The protect member 50 is composed of a main member 51 coated with a hard coat layer 52 formed from the same material as used for forming the hard coat layer 11.

The main member 51 is formed from material that keeps a difference of linear expansion coefficients of the supporting member 22 and each of the conductive-layer forming members 12 and 23 within $1\times10^{-5}/°$ C. Using such a material, the operating temperature ranged from $-40°$ C. to $100°$ C. obtained in the second embodiment can also be maintained in the present embodiment. Regarding a thickness of the main member 51, appropriate rigidity as well as appropriate flexibility required in an input operation need to be considered. On this account, it is preferable to set the thickness at 0.2 mm to 0.5 mm in the case of polycarbonate or acrylic.

The rigidity of the entire touch panel becomes greater by means of the protect member 50 provided for the touch substrate. As a result, durability of the touch panel to withstand input operations can be further improved as compared with the second embodiment, thereby increasing the limited total number of input operations.

The construction of the touch panel used in the third embodiment is explained in detail. An acrylic sheet having a thickness of 0.25 mm or a polycarbonate sheet having a thickness of 0.3 mm is formed as the protect member on the conductive-layer forming member 12 of the touch substrate. Here, an acrylic base adhesive layer having a thickness of 15 μm is set between the conductive-layer forming member 12 and the acrylic sheet or polycarbonate sheet. Note that the touch panel has an input area of 50 mm×100 mm.

An experiment was conducted on the touch panel of the third embodiment and a touch panel of a comparative embodiment. The touch panel of the comparative embodiment was not provided with a protect member.

A plastic pen that had a radius of 0.8 mm and was made of polyacetal was placed on the touch substrate. A load of 1 kg was imposed vertically to the plastic pen. Then, the plastic pen slid on the surface of the touch substrate in arbitrary directions. In each direction; the plastic pen slid to and fro within a distance of 35 mm. This to-and-fro motion was repeated twice in one second as one set, and the set of two motions was in turn repeated 1,000,000 times. After this, the linearity (%) in each detection region was measured according to the method stated in the first embodiment. Each result was within 1%, meaning that the linearity was almost the same as before the experiment was conducted.

Meanwhile, the plastic pen slid on the surface of the touch panel having no protect member. In this case, a load of 500 g was imposed vertically to the plastic pen, and the set of two motions was repeated 100,000 times. After this, the linearity in each detection region was measured. Each result exceeded 1% due to physical damage having occurred to the transparent conductive layer of the touch substrate.

These results indicated that the arrangement of the protect member could reduce physical damages that might occur to the ITO transparent conductive layers of the touch and display substrates due to high-load impact.

INDUSTRIAL APPLICABILITY

The present invention can be favorably used as an input device that is attached on a display device of a portable data terminal, such as a personal digital assistant (PDA) and sub-notebook personal computer.

What is claimed is:

1. A touch panel comprising a first flat substrate having a first conductive layer on a lower main surface and a second flat substrate having a second conductive layer on an upper main surface, the first and second conductive layers facing each other with a certain space in between,
    wherein the first flat substrate includes a conductive-layer forming member onto which the first conductive layer is formed and a supporting member which supports the conductive-layer forming member,
    wherein each of the second flat substrate and the conductive-layer forming member is formed from an amorphous polyolefine base resin sheet,
    wherein a difference between linear expansion coefficients of the supporting member and one of the second flat substrate and the conductive-layer forming member is within $1 \times 10^{-5}/^\circ$ C.

2. The touch panel of claim 1,
    wherein the supporting member is formed from one of an amorphous polyolefine base resin sheet, a polycarbonate base sheet, and an acrylic resin sheet.

3. The touch panel of claim 2,
    wherein the supporting member is formed from one of an amorphous polyolefine base resin sheet, a polycarbonate base sheet, and an acrylic resin sheet.

4. The touch panel of claim 2
    wherein the first and second conductive layers each have a surface roughness that avoids the first and second conductive layers from sticking together.

5. The touch panel of claim 2,
    wherein a protect member is set on a lower main surface of the second flat substrate.

6. The touch panel of claim 1,
    wherein the amorphous polyolefine base resin sheet is formed according to one of a solvent casting method and a fusion extruding method.

7. The touch panel of claim 6,
    wherein the first and second conductive layers each have a surface roughness that avoids the first and second conductive layers from sticking together.

8. The touch panel of claim 7,
    wherein a protect member is set on a lower main surface of the second flat substrate.

9. The touch panel of claim 6,
    wherein a protect member is set on a lower main surface of the second flat substrate.

10. The touch panel of claim 1,
    wherein the first and second conductive layers each have a surface roughness that avoids the first and second conductive layers from sticking together.

11. The touch panel of claim 10,
    wherein a protect member is set on a lower main surface of the second flat substrate.

12. The touch panel of claim 1,
    wherein a protect member is set on a lower main surface of the second flat substrate.

13. A touch panel comprising:
    a first flat substrate having a first conductive layer on a lower main surface and a second flat substrate having a second conductive layer on an upper main surface, the first and second conductive layers facing each other with a certain space in between,
    wherein the first flat substrate includes a conductive-layer forming member onto which the first conductive layer is formed and a supporting member which supports the conductive-layer forming member,
    wherein a difference between linear expansion coefficients of the supporting member and one of the second flat substrate and the conductive-layer forming member is within $1 \times 10^{-5}/^\circ$ C.

14. The touch panel of claim 13,
    wherein the supporting member is formed from one of an amorphous polyolefine base resin sheet, a polycarbonate base resin sheet, and an acrylic resin sheet.

15. The touch panel of claim 13 wherein the supporting member is formed from one of an amorphous polyolefine base resin sheet, a polycarbonate base resin sheet, and a laminate of an amorphous polyolefine base resin sheet and a polycarbonate base resin sheet.

16. The touch panel of claim 15 wherein each of the second flat substrate and the conductive-layer forming member is formed from an amorphous polyolefine base resin sheet.

17. The touch panel of claim 13 wherein a difference between linear expansion coefficients of the supporting member and the conductive-layer forming member is within $1 \times 10^{-5}/^\circ$ C.

* * * * *